(12) United States Patent
Itou et al.

(10) Patent No.: US 9,672,175 B2
(45) Date of Patent: Jun. 6, 2017

(54) COMMUNICATION SYSTEM

(71) Applicant: DENSO CORPORATION, Kariya, Aichi-pref. (JP)

(72) Inventors: Akito Itou, Kariya (JP); Takeyoshi Hirao, Chiryu (JP)

(73) Assignee: DENSO CORPORATION, Kariya (JP)

( * ) Notice: Subject to any disclaimer, the term of this patent is extended or adjusted under 35 U.S.C. 154(b) by 876 days.

(21) Appl. No.: 14/018,456

(22) Filed: Sep. 5, 2013

(65) Prior Publication Data
US 2014/0068126 A1 Mar. 6, 2014

(30) Foreign Application Priority Data

Sep. 6, 2012 (JP) ................................ 2012-196548

(51) Int. Cl.
*G06F 13/00* (2006.01)
*G06F 13/36* (2006.01)
*H04L 12/403* (2006.01)

(52) U.S. Cl.
CPC ............ *G06F 13/36* (2013.01); *H04L 12/403* (2013.01)

(58) Field of Classification Search
CPC .......... G06F 13/36; G06F 13/18; G06F 13/30; G06F 13/372; G06F 13/1605; G05B 2219/1215
USPC .................. 710/110, 105, 113, 114
See application file for complete search history.

(56) References Cited

U.S. PATENT DOCUMENTS

| | | | | |
|---|---|---|---|---|
| 5,349,690 A | * | 9/1994 | Frame .................... | G06F 13/368 710/107 |
| 6,111,888 A | * | 8/2000 | Green .................... | H04J 3/0652 370/447 |
| 6,559,783 B1 | * | 5/2003 | Stoneking ........... | H03M 1/1225 341/120 |
| 6,717,947 B1 | * | 4/2004 | Ghodrat ................. | H04L 12/56 370/395.1 |
| 7,009,969 B1 | * | 3/2006 | Parrish ................ | H04L 12/2602 370/390 |
| 7,171,579 B2 | * | 1/2007 | Weigl .................... | H04J 3/0652 370/312 |

(Continued)

FOREIGN PATENT DOCUMENTS

| | | |
|---|---|---|
| JP | 2006-180205 | 7/2006 |
| JP | 2008-048395 | 2/2008 |
| JP | 2011-103581 | 5/2011 |

OTHER PUBLICATIONS

Office Action (2 pages) dated Jul. 1, 2014, issued in corresponding Japanese Application No. 2012-196548 and English translation (3 pages).

*Primary Examiner* — Tim T Vo
*Assistant Examiner* — Kim T. Huynh
(74) *Attorney, Agent, or Firm* — Nixon & Vanderhye P.C.

(57) ABSTRACT

A communication system having a plurality of communication nodes connected by a communication bus is provided. The system allows at least one non-periodical data message to have a higher priority order than a periodical data message that is transmitted in response to a periodically-transmitted reference message from a master node ECU. In such a manner, a transmission of an urgent non-periodical data message has a higher priority than a transmission of the periodical data message. As a result, a wait time before a start of a transmission of the non-periodical data message is reduced.

12 Claims, 7 Drawing Sheets

(56) References Cited

U.S. PATENT DOCUMENTS

| | | |
|---|---|---|
| 8,347,009 B2 | 1/2013 | Itou et al. |
| 2009/0248933 A1* | 10/2009 | Fukuda .................. H04L 1/188 710/110 |
| 2011/0029704 A1* | 2/2011 | Itou .................. H04L 12/40163 710/110 |
| 2011/0158243 A1* | 6/2011 | Taki ................. H04L 12/40013 370/400 |

* cited by examiner

COMMUNICATION SYSTEM

CROSS-REFERENCE TO RELATED APPLICATION

This application is based on and claims the benefit of priority of Japanese Patent Application No. 2012-196548 filed on Sep. 6, 2012, the disclosure of which is incorporated herein by reference.

TECHNICAL FIELD

The present disclosure generally relates to a communication system having communication nodes connected to a communication bus.

BACKGROUND

The controller area network (CAN) which is standardized as ISO11898-1 is configured to share a communication bus with multiple communication nodes, to assign priority to each of many messages transmitted by the communication nodes, and to arbitrate priorities assigned to those messages, for enabling a communication among certain communication nodes.

In addition to such arbitrated communication, a time division communication that is frequently used in an automotive control, (i.e., a periodical control), is also used in parallel, for example, in a communication method of TTCAN (ISO11898-4), FlexRay (a registered trademark), which is a method disclosed in a patent document 1 (i.e., Japanese Patent Laid-Open No. JP-T-2002-500841 and U.S. Pat. No. 6,111,888), and the like.

For example, according to the communication method in patent document 1, a "master" communication node transmits a sync pulse on the bus periodically. A time division period is defined by the sync pulse, and each of the time division periods is further segmented into three types of time segments. The first segment type is a "sync segment", in which a sync message is transmitted. The sync message is a message that controls each communication node to generate a real-time message. The second segment type is a "real-time segment", in which only a real-time message is transmitted by each communication node. At a time of transmission of the message, an order of transmission of real-time messages by multiple communication nodes is arbitrated according to an arbitration function of the CAN. The third segment type is a "non-real-time segment", in which a non-real-time message prepared in advance by each communication node is transmitted. The transmission of a non-real-time message is postponed until the next time division period, if the allocated time of the non-real-time segment is not sufficient in period/length for the transmission of all of the non-real-time messages.

As described above, the communication method in patent document 1 defines different time segments for transmitting different messages. That is, separate segments are defined (i) for the transmission of a periodical data message (i.e., a real-time message) which is used for performing a periodical control, and (ii) for the transmission of a non-periodical data message (i.e., a non-real-time message) which is used for performing an event-driven control that is required in response to an occurrence of a certain event.

Generally, an automobile includes a brake control unit, an engine control unit and the like, for example, which must execute commands in "real-time" in response to event-driven control or according to a user operation. However, with the above communication method, the message for event-driven control may be transmitted as a non-real-time message. Therefore, even when the transmission of such a message should be performed immediately, the transmission may be delayed until the end of the transmission of a periodical data message, for example, if the transmission of such message occurs during the time segment for transmitting the periodical data message. In such a manner, the start of the transmission of the non-periodical data message, which should be transmitted immediately and without delay, may be delayed.

SUMMARY

It is an object of the present disclosure to provide a communication system for reducing a wait time before a start of transmission of an urgent non-periodical data message.

In an aspect of the present disclosure, a communication system has a plurality of communication nodes connected by a communication bus, the system includes one communication node among the plurality of communication nodes serving as a master node including a reference message transmission unit for periodically transmitting a reference message that requests other communication nodes for data transmission. The system also has at least one first node among the plurality of communication nodes including a first priority order information transmission unit for transmitting, in response to a reception of the reference message, predetermined priority order information that is pre-associated with a periodical data message. A first determination unit determines which of the priority order information transmitted by the other communication nodes and the priority order information transmitted by the at least one first node represents a higher priority order. A first data message transmission unit transmits the periodical data message in immediate succession to the priority order information when the first determination unit determines that the priority order information transmitted by the at least one first node represents a higher priority order than the priority order represented by the priority order information transmitted by the other communication nodes, wherein, when the first determination unit determines that the priority order information transmitted by the at least one first node represents a lower priority order than the priority order represented by the priority order information transmitted by the other communication nodes, the first priority order information transmission unit re-transmits the priority order information after completion of transmission of the periodical data message by the other communication nodes. The system further includes at least one second node among the a plurality of communication nodes including a second priority order information transmission unit for transmitting, (a) irrespective of a reception of the reference message and (b) according to a data transmission request, predetermined priority order information that is pre-associated with a non-periodical data message. A second determination unit determines which of the priority order information transmitted by the other communication nodes and the priority order information transmitted by the at least one second node represents a higher priority order. A second data message transmission unit transmits the non-periodical data message in immediate succession to the priority order information when the second determination unit determines that the priority order information transmitted by the at least one second node represents a higher priority order than the priority order represented by the priority order information transmitted by the other communication nodes, wherein, when the second determination unit determines that the priority order information transmitted by the at least one second node represents a lower priority order than the priority order represented by the priority order information transmitted by the other communication nodes, the second priority order information transmission unit re-transmits the priority order information after completion of transmission of the non-periodical data message by the other communication nodes, and further wherein the priority order of at least one non-periodical data message that is transmitted by the at least one second node has a higher priority order than the priority order of at least one periodical data message that is transmitted by the first node.

In other words, in the communication system of the present disclosure, the time segments for periodical data transmission or for non-periodical data transmission are not defined according to a time interval defined by the reference message. Therefore, the second node may begin transmitting the non-periodical data message arbitrarily at any moment. However, when a transmission of one message competes with a transmission of another message (i.e., when a competition among a reference message, a periodical data message, and a non-periodical data message occurs), which message to be transmitted is determined according to an arbitration based on the priority orders associated with the respective messages.

Further, in the communication system of the present disclosure, the priority order of at least one non-periodical data message is set to be higher than the priority order of at least one periodical data message. Therefore, by setting a higher priority order to the non-periodical data message relative to the priority order of the periodical data message, the non-periodical data message will be transmitted immediately and the wait time before a start of transmission of such non-periodical data message may be reduced.

Moreover, the communication system of the present disclosure performs a transmission of the periodical data message according to the reference message that is periodically transmitted. Therefore, by setting a higher priority order to the periodical data message than the priority order of the non-periodical data message that does not require immediate transmission (i.e., transmission of the non-periodical data message is not urgent), required data for performing a periodical control is securely transmitted.

Furthermore, since the communication method of the communication system in the present disclosure is based on the CAN standard that is standardized by ISO, there is no need to newly develop a controller, a transceiver and the like, which allows for a quick and low-cost implementation of the system.

The above-described configuration of the present disclosure will be further described in reference to the description and the drawings in the following embodiments.

Additionally, the parenthesized numerals in the above only illustrate an exemplary relationship between structures in the embodiment and the claim languages, and are not intended to be limiting.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
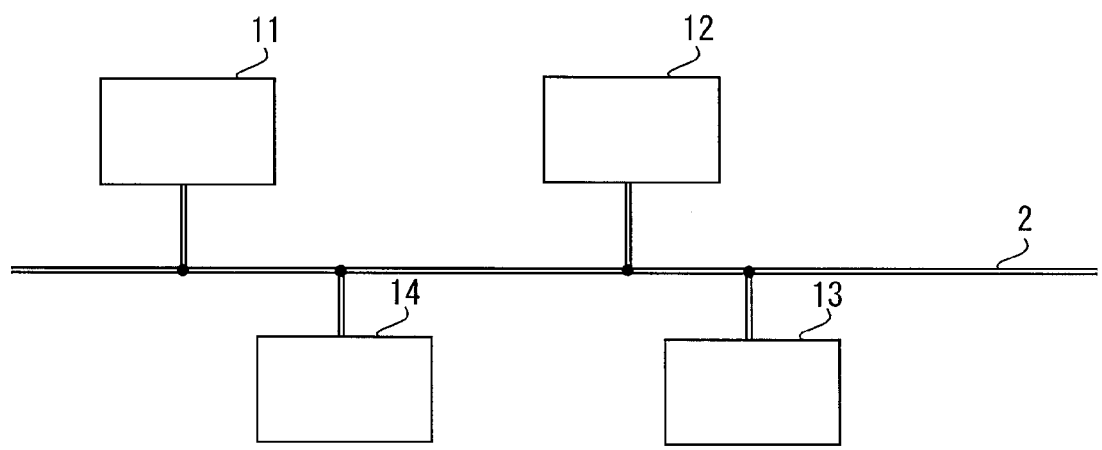
FIG. 1 is a block diagram of a communication system in an embodiment of the present disclosure.

An embodiment of the present disclosure is described in the following based on the drawings. FIG. 1 is a block diagram of a configuration of a communication system in an embodiment of the present disclosure. The communication system in the present embodiment is preferably used in a vehicle for implementing an in-vehicle LAN. In a vehicle, multiple electronic control units (ECUs) communicate with each other to exchange data, for the purpose of performing a periodical/non-periodical control, based on a predetermined event, for example. The communication system in the present embodiment is capable of transmitting both periodical data messages and non-periodical data messages. The communication system securely transmits the periodical data messages at predetermined intervals and timely transmits the non-periodical data messages, such that periodical/non-periodical control based on the transmission of those data messages is achieved. An application of the communication system in the present embodiment is not necessarily limited to a vehicle use, and may include a variety of other uses unless other restriction hinders such application.

Electronic control units (ECU) 11-14 are connected to each other using a communication bus 2 as shown in FIG. 1 to be serving as multiple communication nodes. For example, each of the ECUs 11-14 are used for controlling various in-vehicle devices (e.g., a fuel injection device of an engine, an ignition device, a motor, a brake system and the like) that are installed in a vehicle.

An ECU among the ECUs 11-14 is chosen as a master node of communication. The master node periodically transmits a reference message requesting other ECUs (i.e., other communication nodes) for a transmission of periodical data. Further, at least one ECU among the ECUs 11-14 is an ECU that transmits a periodical data message in response to the reception of the reference message, and at least one ECU among the ECUs 11-14 is an ECU that transmits a non-periodical data message, irrespective of the reception of the reference message and according to an occurrence of a predetermined event that generates a data transmission request.

The ECU chosen as a master node from among the ECUs 11-14 is preferably an ECU that has a need to transmit a periodical data message at a shortest interval, or is preferably an ECU that has a need to transmit a plurality of periodical data messages. When an ECU that has a need to transmit a periodical data message at the shortest interval is chosen as a master node, a transmission of a "triggering" reference message, which is solely used for triggering periodical data transmission, may be omitted by putting (i.e., including) periodical data in another (i.e., "non-triggering") reference message, where the reference message includes the periodical data message (i.e., the reference message can partially serve as the periodical data message). Further, when an ECU having the largest number of the periodical data messages to be transmitted is chosen as a master node, the transmission of the periodical data message is efficiently performed by the master node ECU. As such, while the ECUs that have received the reference message are preparing the periodical data message, the master node ECU is configured to transmit the periodical data message in immediate succession to the reference message. That is, in immediate succession is further defined as immediately after and without a pause such that there is no time delay between the end of transmission of the periodical data message and the beginning of transmission of the reference message.

The communication system in the present embodiment sets predetermined priority orders of the messages that are transmitted by each of the ECUs according to the importance of the message or according to the type of the messages. Further, at a time of transmission of each message, priority order information (i.e., an ID code) representing a priority order of each message is transmitted first. At such a moment, if transmissions of priority order information of multiple messages compete with each other, an arbitration is performed for determining the priority orders among the priority order information of the respective messages, and for allowing the priority order information (i.e., an ID code) having the highest priority order to obtain a transmission right for transmitting a message.

The reference message transmitted by the master node ECU is configured to have a higher priority order than the periodical data message or the non-periodical data message transmitted by the other ECUs. Therefore, even when the transmission of such a reference message competes with the transmission of other messages, a delay of transmission of the reference message due to a "lost in arbitration" outcome (i.e., has a lower priority order) will be prevented. As a result, the master node can transmit the reference message substantially at a constant interval.

Now, an internal configuration of each ECU for performing a communication according to a CAN protocol is described with reference to the drawing in FIG. 2. Since the internal configuration of each ECU is substantially same, an ECU 11 is described as an exemplary ECU.

Figure 2:
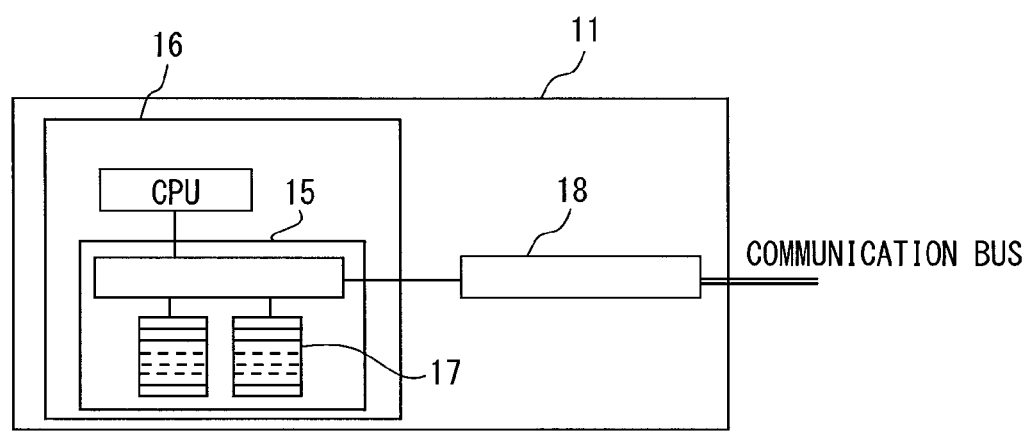
FIG. 2 is a block diagram of an internal configuration of each ECU for performing a communication according to a CAN protocol.

As shown in FIG. 2, an ECU 11 has a built-in CAN controller 15 that controls a communication with other ECUs 12-14 according to the CAN protocol, and also has a microcomputer 16 that cooperates with other ECUs to perform various control processes through an exchange of messages with other ECUs via the CAN controller 15. Furthermore, the ECU 11 has a CAN transceiver 18 that transmits and receives, through the communication bus 2, a frame that is generated by the CAN controller 15.

The CAN controller 15 has multiple message boxes 17 for storing messages and the like that are to be transmitted and received among the ECUs, which is a well-known configuration. Further, the CAN controller 15 performs various communication controls, including a transmission control that converts a message into a frame based on a stored value in the message box 17 and transmits the frame to the communication bus 2 through the CAN transceiver 18. The CAN controller 15 also performs a reception control that receives a message through the CAN transceiver 18 for extracting a message and an arbitration control that performs an arbitration to determine which message should have a transmission right at a time of collision on the communication bus 2 (i.e., a bit-by-bit non-destructive arbitration), together with an error detection and notification that detects and/or notifies of an error generated by the transmission and the reception of a frame, and the like.

When the microcomputer 16 has a message which should be transmitted to the other ECUs, the microcomputer 16 identifies, based on a content of such message, the priority order information (i.e., an ID code) that represents a priority order of such message, and stores the message and its ID code respectively in a message register and in an ID register of a message box 17 of the CAN controller 15. At such a moment, a purpose register accompanying each of the message boxes 17 is established, for designating that the message box 17 is currently used for transmitting a message.

When a message to be transmitted is stored in a message box 17 of the CAN controller 15 by the microcomputer 16, the CAN controller 15 performs a transmission control, in which (i) a frame is generated based on the stored value (i.e., an ID code and a message) in a message box 17 that is designated by the purpose register as being used for a message transmission, and (ii) the frame is transmitted through the CAN transceiver 18.

In the following, an arbitration control is described with reference to the drawing in FIG. 3. Further, in FIG. 3, numerals 31, 41, 51, 61, and 71 are ID codes respectively representing a priority order that is stored in respective arbitration fields, and numerals 30, 40, 50, 60, and 70 are bodies of the message, which are made up from a control field and a data field respectively.

In the CAN protocol, a frame begins with an SOF (Start of Frame) code that indicates a start of a frame. Next, in an arbitration field that is subsequent to the SOF code, an ID code that indicates a priority order and a data type in subsequent data fields (i.e., what kind of data for the transmission is in the data fields) is stored. Further, in the control field that is subsequent to the arbitration field, the number of bytes of the data in the data field is stored. Then, in the data field, the data itself that is to be transmitted is stored. In the data field, data of 0 to 8 bytes is normally stored.

The CAN controller 15, which has a frame that should be transmitted immediately, starts a transmission of the frame when the communication bus 2 is not in use. When the communication bus 2 is in use, the CAN controller 15 waits for a predetermined number of bits (i.e., three) before starting the transmission of the frame, after the release of the communication bus 2 (i.e., after the end of transmission of the other frame). Therefore, when there are multiple CAN controllers 15 that are trying to transmit a frame, a collision of frames occur on the communication bus 2 after the release of the communication bus 2, since the controllers 15 simultaneously start to transmit the frames, as shown in FIG. 3 at a time T1.

When such collision of frames occurs, the CAN protocol resolves such collision by performing an arbitration control, which determines which one of many frames should be prioritized by using the above-described ID code. In the arbitration control, the CAN controller 15 which has transmitted a frame having an ID code whose logic value is smallest among others obtains a transmission right. Further, a frame that has an urgent message/data demanding a quick response time normally has a higher priority ID code, such that the transmission of such frame is prioritized at a time of collision over other frames. In an example of FIG. 3, a collision of frames starting at the time T1 is resolved by assigning a transmission right to a frame that has an ID code 51, which then transmits a body of a message 50.

Figure 3:
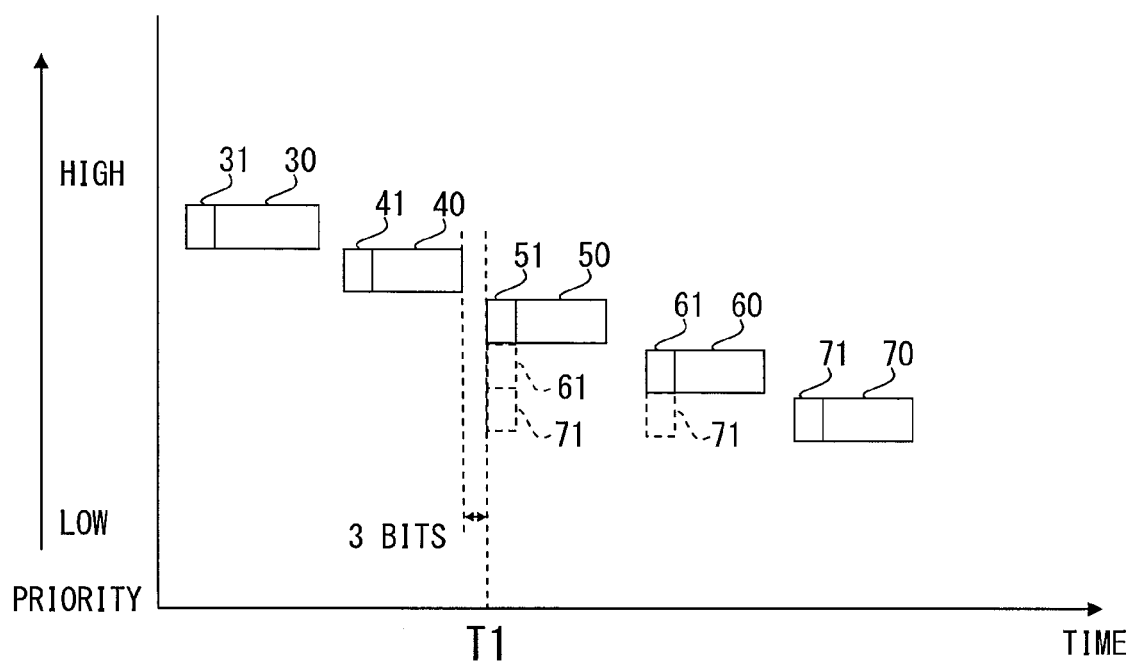
FIG. 3 is a diagram of an arbitration control according to the CAN protocol.

In the example of FIG. 3, when the CAN controller 15 has lost in the arbitration, the "lost-in-arbitration" CAN controller 15 re-starts a transmission of an ID code after completion of transmission of the body of the message 50. In such a manner, according to the respective priority orders, the transmission of bodies of messages 60, 70 is also performed.

Further, when messages are waiting to be received from the other ECUs 12-14, the microcomputer 16 sets the purpose register of the message box 17 of the CAN controller 15 to designate that the message box 17 is currently used for a message reception, and stores the ID codes corresponding to the to-be-received messages in the ID code register of the message box 17. Then, the CAN controller 15 performs a reception control, in which the controller 15 receives a frame that has a matching ID code with the stored ID code in the ID code register of the message box 17 that is designated as being used for a message reception, extracts a message from the received frame, and stores the extracted message in the message register of the ID code matching message box 17.

Then, the microcomputer 16 receives messages from the other ECUs 12-14 by reading a content of the message register of the message boxes 17 that are designated as being used for a message reception, when the microcomputer 16 has received from the CAN controller 15 a notification indicating a reception of a frame, by using an interrupt, a flag, or the like.

Based on the above-described configuration for performing a communication according to the CAN protocol, the communication control according to such a configuration in each of the ECUs 11-14 is performed.

In the following, a process performed in the master node ECU that is chosen from among the ECUs 11-14 is described with reference to a flowchart in FIG. 4 and a time chart in FIG. 5.

Figure 4:
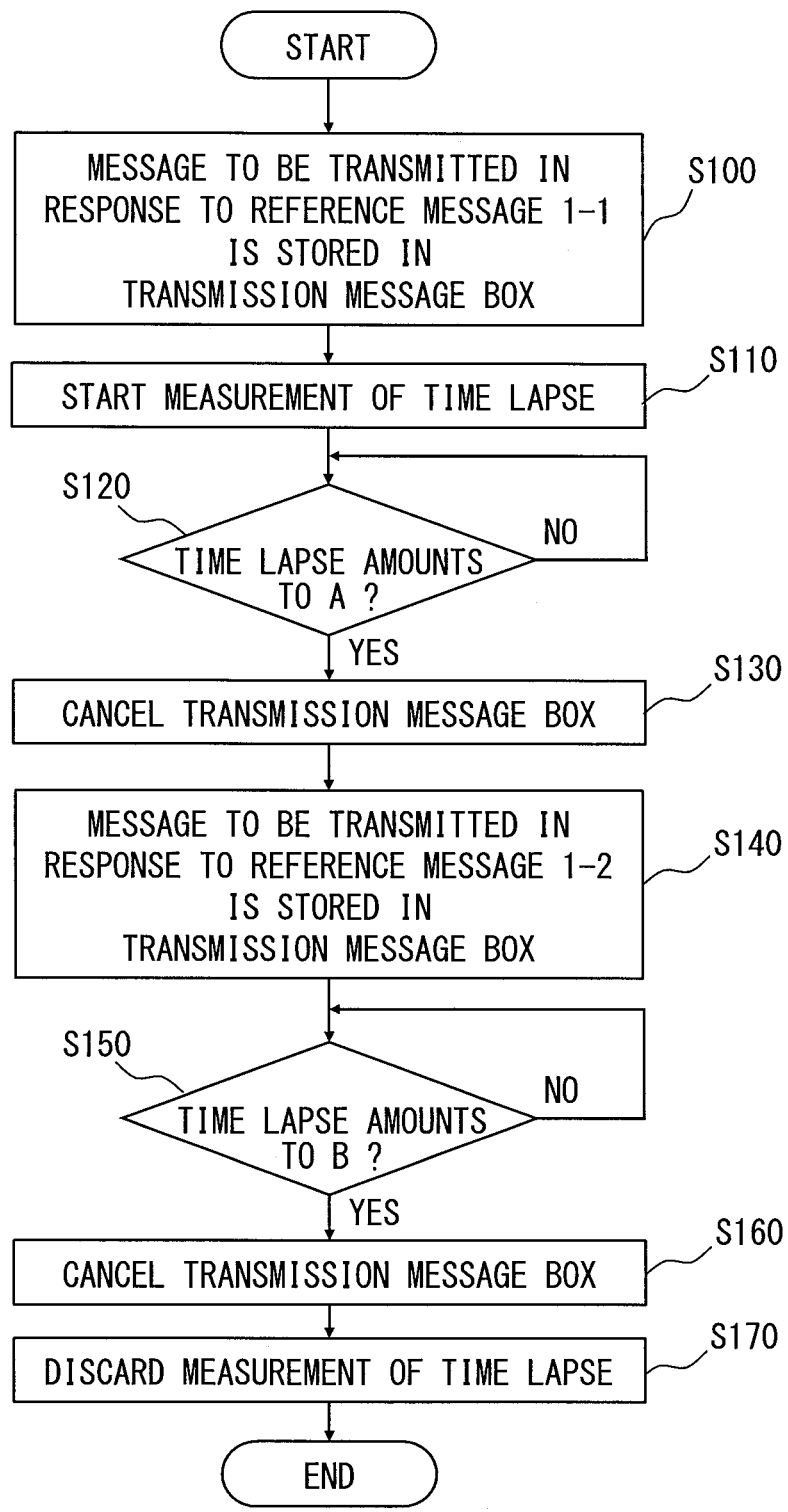
FIG. 4 is a flowchart of a process that is performed by an ECU that is chosen as a master node.
Figure 5:
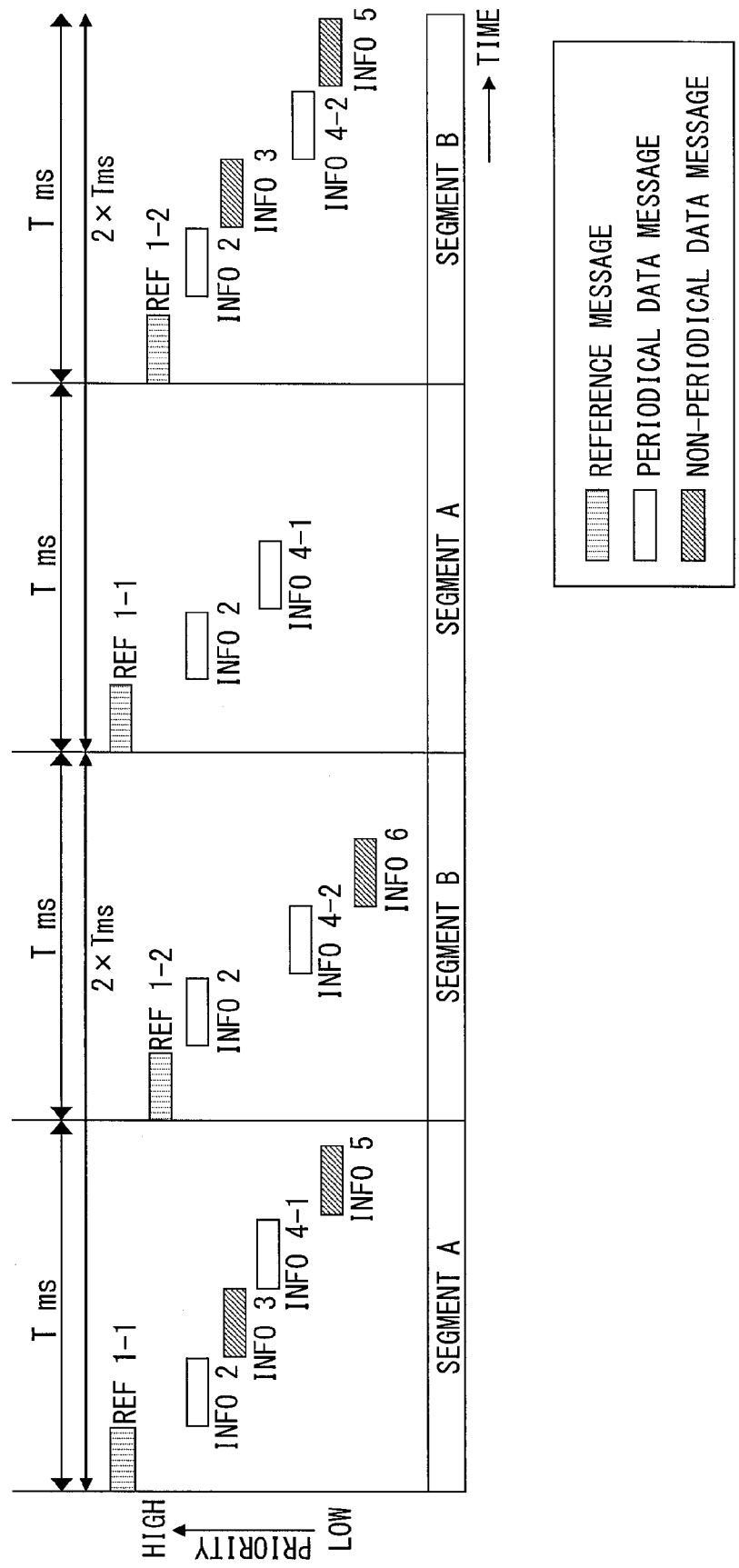
FIG. 5 is a time chart illustrating the transmitting of messages of the communication system in an embodiment of the present disclosure.

In an example illustrated by FIG. 4 and FIG. 5, multiple type reference messages 1-1, 1-2 are set in advance, and the master node ECU transmits the multiple type reference messages in turn at a standard interval (i.e., in every standard period) T. The standard period T is set to have a sufficient time period/length for allowing each of all ECUs, which are in need of performing a periodical transmission of data, to transmit a periodical data message once for fulfilling such need of the periodical transmission of data. The standard period T corresponds to a "transmission interval" in the claims.

By setting multiple type reference messages as described above, the periodical data messages having respectively different transmission periods can be transmitted according to the respectively different transmission periods. The details of the periodical data transmission are further described in the following.

In an example of FIG. 5, information 2 is repeatedly transmitted as a periodical data message in every standard period T. In other words, the transmission period of the information 2 is equal to the standard period T. On the other hand, information 4 as a periodical data message is divided into information 4-1 and information 4-2, and the information 4-1 is transmitted in response to the reference message 1-1, and the information 4-2 is transmitted in response to the reference message 1-2. Therefore, the transmission period of the information 4 is substantially equal to twice the standard period T (i.e., 2*T).

That is, (i) by setting multiple type reference messages 1-1, 1-2 in the above-described manner, and (ii) by transmitting such messages in turn in every standard period, and (iii) by transmitting the periodical data message in response to the received reference message from the ECUs that has a need to transmit the periodical data message, the multiple type periodical data messages having respectively different transmission intervals can successfully be transmitted at the respectively different transmission intervals.

In such case, (i) by setting the standard period to have a shortest transmission period for transmitting information that has a need to be periodically transmitted among various transmission periods and (ii) by devising a longer transmission period, which is realized by preparing a required number of reference message types (i.e., by preparing a required number of ID codes), the above transmission scheme for transmitting the multi-type data messages in various intervals is realized. Further, for enabling each of all periodical data messages to be transmitted within one standard period, distribution of the periodical data messages into different time segments may be performed, as required, together with other arrangements.

That is, FIG. 5 clearly shows an example, in which the information 2 and the information 4-1 are transmitted respectively as the periodical data message within the standard period and within the two-fold standard period, by setting the two type reference messages (i.e., Segment A having Info 2 and Info 4-1). Further, a three-fold standard period (i.e., Segment B having Info 2, Info 4-2, and Info 6) and a four-fold standard period (i.e., Segment A having Info 2, Info 3, Info 4-1, and Info 5; and Segment B having Info 2, Info 3, Info 4-2, and Info 5) may further be used, as required, for transmitting the periodical data messages. For employing such an integer-number-fold standard period, the number of types of the reference messages can simply be increased (i.e., the number of ID code types can simply be increased), as required.

Further, after dividing the information 4 into the information 4-1 and the information 4-2, the information 4 in the example in FIG. 5 is distributed into a segment A that corresponds to the reference message 1-1 and into a segment B that corresponds to the reference message 1-2. In such a manner, a preventive effect is expected, in which a concentration of the messages to one specific time segment is prevented. However, a message such as the information 4 having a longer transmission period that is longer than the standard period T may be transmitted without dividing. That is, the information 4-1 and the information 4-2 may both be simultaneously transmitted in response to a reception of the reference message 1-2.

Further, the communication system in the present embodiment allows a non-periodical data message to have a higher priority order than the priority order of the periodical data message. That is, for example, a priority order of information 3 that is a non-periodical data message is higher than a priority order of the information 4 (i.e., priority orders of the information 4-1 and the information 4-2) that is a periodical data message. In such a manner, the wait time before a start of transmission of information 3, that should be transmitted immediately as the non-periodical data message, is reduced to the minimum.

However, the number of the non-periodical data messages having a higher priority order than the periodical data message is limited to a predetermined value, or within a certain value range, for enabling the transmission of each of all periodical data messages from the first nodes within the standard period T. That is, even if the transmission of the non-periodical data messages having a higher priority order than the periodical data message is performed in the same standard period T, by limiting the number of such non-periodical data messages, the transmission of each of all periodical data messages is successfully completed in one standard period T. Such limitation of the number of the non-periodical data messages is imposed for preventing the loss of the periodical data message, which may otherwise be caused due to the non-transmission of the periodical data message by the end of the standard period T. Therefore, the non-periodical data message having a higher priority order than the periodical data message is carefully chosen in view of the urgency, the importance and the like. In other words, the non-periodical data messages having no need for immediate transmission have a lower priority order than the periodical data messages.

Further, each of the ECUs transmitting the periodical data message pre-obtains the to-be-transmitted data, and keeps such data in each of the ECUs. The obtainment and the keeping of such data are performed after the transmission of the periodical data message, and are completed before the next transmission of the periodical data message. Then, at a reception timing a reference message, each of the ECUs transmitting the periodical data message stores, in the message box that is used for a message transmission, the "kept in the ECU" data which has been pre-obtained and is kept in the ECU at such timing. Therefore, even when various kinds of data such as an engine rotation number, a motor rotation number and the like are transmitted/distributed to many ECUs by using multiple periodical data messages, the data to the respective ECUs are "in-sync". That is, the data sampled substantially at the same timing is distributed to the respective ECUs.

Further, when (i) the data messages that should be periodically transmitted have a target transmission period that is not equal to an integer-number-fold period of the standard period T that is used for transmitting the reference message, and (ii) the target transmission period is shorter than the transmission period of a certain periodical data message, such data messages may be transmitted as the non-periodical data messages having a higher priority order than the periodical data message. In such a manner, such data messages that should be periodically transmitted can be transmitted substantially in the desired target transmission period, even when the desired target transmission period is not equal to an integer-number-fold period of the standard period T of the reference message.

In step S100 of a flowchart of FIG. 4, the master node ECU, which is chosen as a master node from among many ECUs, generates a frame of the reference message 1-1 of FIG. 5 and a frame of the periodical data message that is transmitted in response to the reference message 1-1 (i.e., the information 2 in FIG. 5), and stores the frames in the message box 17 (i.e., including the reference message 1-1). Since the reference message 1-1 stored in the message box 17 has a highest priority order, the reference message 1-1 is immediately transmitted according to the transmission control of the CAN controller 15 as described above. Then, the periodical data message (i.e., the information 2 in FIG. 5) is transmitted in immediate succession to the completion of the transmission of the reference message 1-1, since the information 2 has, as shown in FIG. 5, a highest priority order among the periodical data messages.

As described above, the communication system in the present embodiment transmits the data messages in a novel manner, in which the periodical data message (i.e., the information 2 in FIG. 5) that is transmitted in immediate succession to the reference message 1-1 is transmitted by a master node ECU. Therefore, the transmission of the periodical data message is efficiently performed by transmitting (i.e., starting a transmission of), from the master node ECU, the periodical data message in immediate succession to the transmission of the reference message while the other ECUs that have received the reference message are preparing the periodical data message.

Then, in step S110, a measurement of a time lapse substantially from a start timing of transmission of the reference message 1-1 is performed. Then, in step S120, the process determines whether the time lapse has amounted to a time amount A, which is equal to the standard period T as shown in FIG. 5. When the process in such a determination step determines that the time lapse has amounted to the time amount A, the process proceeds to step S130, in which the process cancels the message box 17 that is used for a message transmission, and discards the frames of the reference message 1-1 and the periodical data message (i.e., the information 2 in FIG. 5).

Then, in step S140, the process tries to transmit the reference message 1-2 by generating a frame of the reference message 1-2 and a frame of the periodical data message (i.e., the information 2 in FIG. 5) and by storing those frames in the message box 17 (i.e., including the reference message 1-2), since the time amount A has passed from the start of the transmission of the reference message 1-1. In such a manner, the reference message 1-2 and the periodical data message equivalent to the information 2 in FIG. 5 are transmitted in turn.

In step S150, the process determines whether the time lapse, substantially from a start of transmission of the reference message 1-1, has amounted to a time amount B. The time amount B is equal to a double portion of the standard period T in FIG. 5. In such a determination step, when the process determines that the time lapse has amounted to the time amount B, the process proceeds to step S160, in which the process cancels the message box that is used for a message transmission, and discards the frames of the reference message 1-2 and the periodical data message (i.e., the information 2 in FIG. 5), in preparation for the next transmission of the reference message 1-1 and the like. Then, in step S170, the process discards the measurement of the time lapse that is started in step S110.

Figure 6:
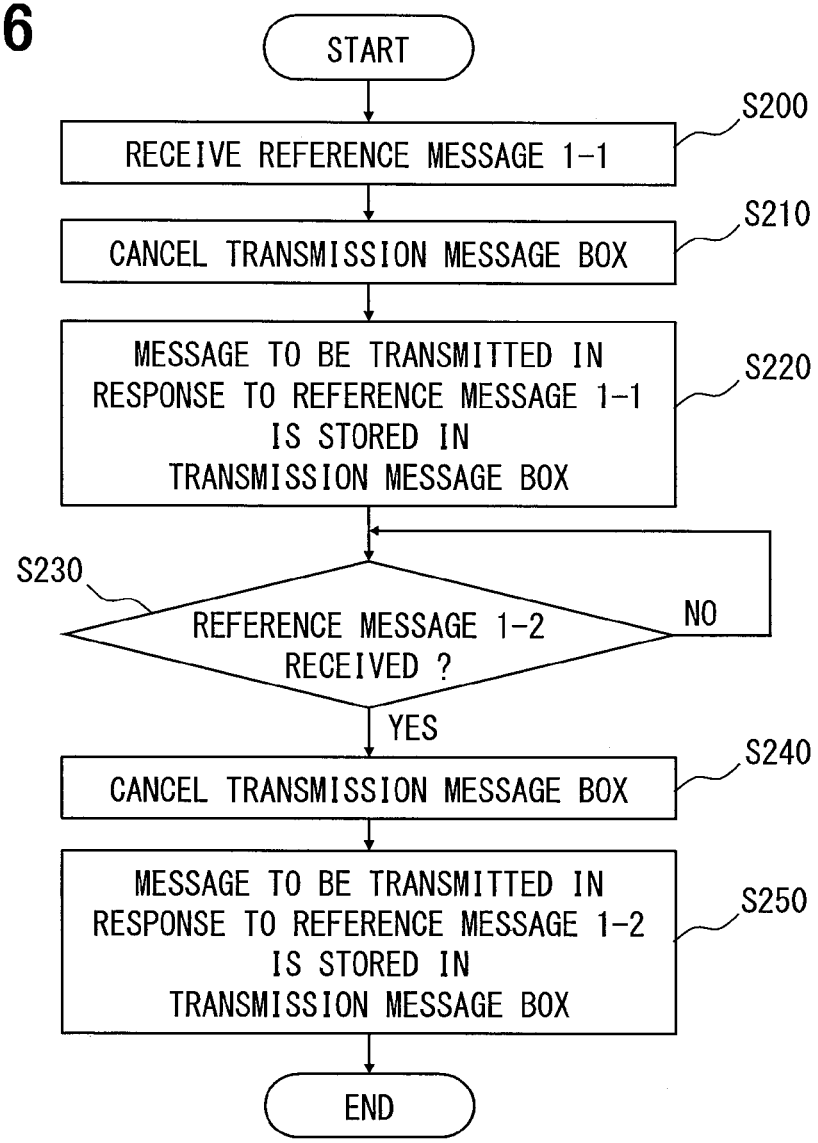
FIG. 6 is a flowchart of a process that is performed by an ECU that has received a reference message from the master node ECU.

Then, a process performed by an ECU that has received the reference messages 1-1, 1-2 from the master node ECU is described with reference to a flowchart in FIG. 6.

First, in step S200, the process receives the reference message 1-1. Then, in step S210, the process cancels the message box 17 that is used for a message transmission in preparation for the transmission of a new periodical data message. Then, in step S220, the process generates a frame of a message which is transmitted in response to the reference message 1-1, and stores the message in the message box 17 that is used for a message transmission.

In step S230, the process determines whether the reference message 1-2 has been received. If the process in such a determination step determines that the reference message 1-2 has been received, the process proceeds to step S240, and cancels the message box 17 that is used for a message transmission. Then, in step S250, the process generates a frame of a message that is transmitted in response to the reference message 1-2, and stores the message in the message box 17 that is used for a message transmission.

Figure 7:
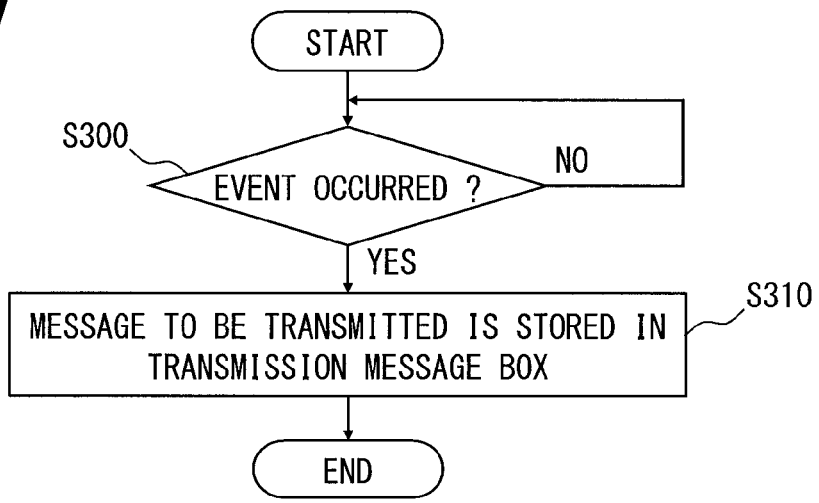
FIG. 7 is a flowchart of a process that is performed by an ECU that transmits predetermined data irrespective of a reception of the reference message and according to an occurrence of a predetermined event.

Next, with reference to a flowchart in FIG. 7, a process that is performed by an ECU transmitting the predetermined data, irrespective of the reception of the reference messages 1-1, 1-2 and according to an occurrence of a predetermined event, is described.

First, in step S300, the process determines whether a predetermined event has occurred. When the process in such a determination step determines that the predetermined event has occurred, the process proceeds to step S310, in which the process stores, in the message box 17, the non-periodical data message that should be transmitted in response to an occurrence of the event.

Figure 8:
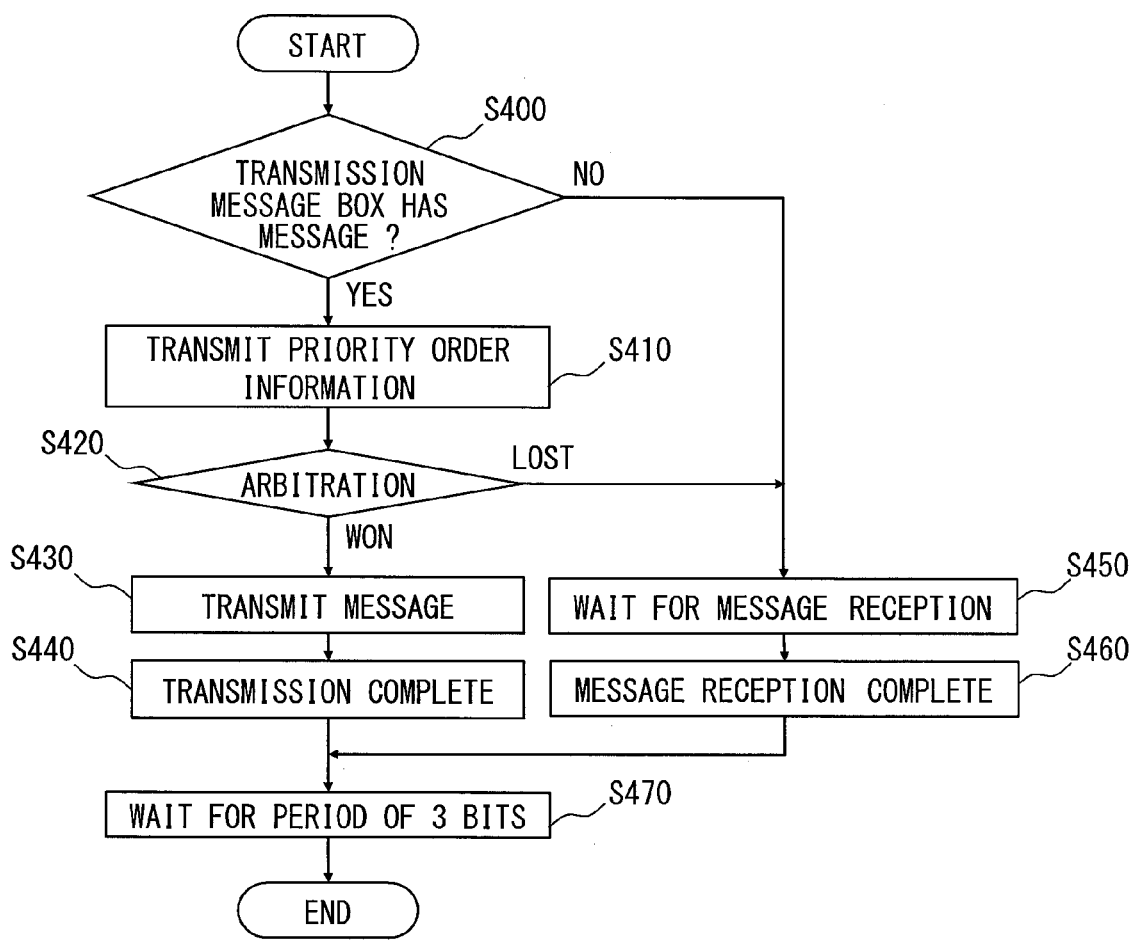
FIG. 8 is a flowchart of a process that is performed by all ECUs including the master node ECU for a transmission of a message that is stored in a transmission message box and for a reception of a message that is transmitted by the other ECUs.

FIG. 8 shows a flowchart of a process that is performed in all ECUs, including the master node ECU, for a transmission of a message that is stored in the message box 17 and for a reception of a message that is transmitted by the other ECUs.

First, in step S400, the process determines whether the message box 17 for a message transmission has a message stored therein. If the process in such a determination step determines that the message box 17 for a message transmission has a stored message, the process proceeds to step S410, and when the process in such a determination step determines that the message box 17 for a message transmission does not have a stored message, the process proceeds to step S450.

In step S410, the process transmits an ID code that is associated with the stored message, (i.e., the priority order information is transmitted). In step S420, the process determines whether the transmitted priority order information has won or has lost in an arbitration. When the process determines that the priority order information has won in the arbitration, the process proceeds to step S430. When the process determines that the priority order information has lost in the arbitration, the process proceeds to step S450.

In step S430, the process transmits a message in immediate succession to a transmission of the ID code. When, in step S440, the process determines that the transmission of the message has completed, the process proceeds to step S470, and waits for a period of 3 bits, and the process ends for a current cycle of execution. On the other hand, in step S450, the process waits for a reception of the message from the other ECUs, and, when the process determines that the reception of the message has completed in step S460, the process proceeds to step S470.

By performing the process shown in FIG. 8, the transmission/reception of the message and the arbitration control of the priority orders are performed according to the conventional CAN protocol.

In summary, as described above, the communication system of the present embodiment may reduce a wait time before a start of transmission of a non-periodical data message that should immediately be transmitted, since the non-periodical data message has a higher priority order than at least one periodical data message.

Further, the communication system of the present embodiment transmits the periodical data message in response to the reference message that is periodically transmitted. The priority order of the periodical data message is set to be higher than the priority order of the non-periodical data message that is not required to be immediately transmitted. Therefore, the periodical data message is securely transmitted within a standard period T, thereby preventing a loss of the periodical data message.

Furthermore, since the communication method of the communication system in the present embodiment is based on a CAN protocol that is standardized by ISO, there is no need to newly develop a controller, a transceiver and the like for the communication system, thereby providing a quick and low-cost implementation of the system.

Although the present disclosure has been fully described in connection with the above embodiment in reference to the accompanying drawings, it is to be noted that various changes and modifications will become apparent to those skilled in the art.

Figure 9:
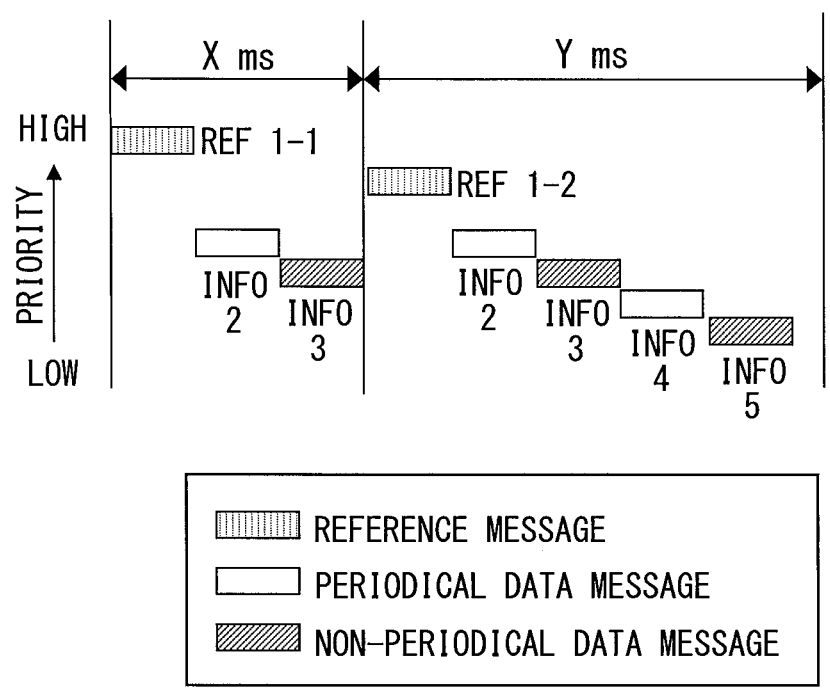
FIG. 9 is a time chart illustrating the transmitting of messages of a modified communication system in an embodiment of the present disclosure.

For example, the above embodiment is about an "in-turn" transmission of the reference messages 1-1 and 1-2 in every standard (transmission) period T when the system has multiple reference message types. However, as shown in FIG. 9, the transmission period (i.e., intervals X and Y) of the reference message may be changed according to the reference message type.

Such changes and modifications are to be understood as being within the scope of the present disclosure as defined by the appended claims.

What is claimed is:

1. A communication system having a plurality of communication nodes connected by a communication bus, the system comprising:
    (A) one communication node among the plurality of communication nodes serving as a master node including
        a reference message transmission unit for periodically transmitting reference message that requests other communication nodes for data transmission;
    (B) at least one first node among the plurality of communication nodes including
        a first priority order information transmission unit for transmitting, in response to a reception of the reference message, predetermined priority order information that is pre-associated with a periodical data message,
        a first determination unit for determining which of the priority order information transmitted by the other communication nodes and the priority order information transmitted by the at least one first node represents a higher priority order, and
        a first data message transmission unit for transmitting the periodical data message in immediate succession to the priority order information when the first determination unit determines that the priority order information transmitted by the at least one first node represents a higher priority order than the priority order represented by the priority order information transmitted by the other communication nodes, wherein,
        when the first determination unit determines that the priority order information transmitted by the at least one first node represents a lower priority order than the priority order represented by the priority order information transmitted by the other communication nodes, the first priority order information transmission unit re-transmits the priority order information after completion of transmission of the periodical data message by the other communication nodes;
    (C) at least one second node among the a plurality of communication nodes including
        a second priority order information transmission unit for transmitting, (a) irrespective of a reception of the reference message and (b) according to a data transmission request, predetermined priority order information that is pre-associated with a non-periodical data message,
a second determination unit for determining which of the priority order information transmitted by the other communication nodes and the priority order information transmitted by the at least one second node represents a higher priority order, and
a second data message transmission unit for transmitting the non-periodical data message in immediate succession to the priority order information when the second determination unit determines that the priority order information transmitted by the at least one second node represents a higher priority order than the priority order represented by the priority order information transmitted by the other communication nodes, wherein,
when the second determination unit determines that the priority order information transmitted by the at least one second node represents a lower priority order than the priority order represented by the priority order information transmitted by the other communication nodes, the second priority order information transmission unit re-transmits the priority order information after completion of transmission of the non-periodical data message by the other communication nodes; and
(D) wherein the priority order of at least one non-periodical data message that is transmitted by the at least one second node has a higher priority order than the priority order of at least one periodical data message that is transmitted by the first node.

2. The communication system of claim 1, wherein a transmission interval, during which the master node periodically transmits the reference message, has a time length for allowing each of all first nodes to transmit a periodical data message once.

3. The communication system of claim 1, wherein the reference message transmission unit in the master node is capable of transmitting plural type reference messages, and
the at least one first node has a transmission data message determination unit for determining a periodical data message that should be transmitted according to a reference message type.

4. The communication system of claim 1, wherein the master node transmits the periodical data message in immediate succession to the transmission of the reference message.

5. The communication system of claim 1, wherein the priority order of the reference message is higher than the priority order of the periodical data message and the priority order of the non-periodical data message.

6. The communication system of claim 1, wherein a node that has a need to transmit data at a shortest transmission interval is chosen as the master node from among the plurality of communication nodes.

7. The communication system of claim 1, wherein a node that has a need to transmit a largest amount of data is chosen as the master node from among the plurality of communication nodes.

8. The communication system of claim 1, wherein the reference message includes periodical data to be transmitted to other communication nodes.

9. The communication system of claim 1, wherein the communication system is used in a vehicle.

10. A communication system having a plurality of communication nodes connected by a communication bus, the system comprising:
(A) one communication node among the plurality of communication nodes serving as a master node including
a reference message transmission unit for periodically transmitting a reference message that requests other communication nodes for data transmission;
(B) at least one first node among the plurality of communication nodes including
a first priority order information transmission unit for transmitting, in response to a reception of the reference message, predetermined priority order information that is pre-associated with a periodical data message,
a first determination unit for determining which of the priority order information transmitted by the other communication nodes and the priority order information transmitted by the at least one first node represents a higher priority order, and
a first data message transmission unit for transmitting the periodical data message in immediate succession to the priority order information when the first determination unit determines that the priority order information transmitted by the at least one first node represents a higher priority order than the priority order represented by the priority order information transmitted by the other communication nodes, wherein:
when the first determination unit determines that the priority order information transmitted by the at least one first node represents a lower priority order than the priority order represented by the priority order information transmitted by the other communication nodes, the first priority order information transmission unit re-transmits the priority order information after completion of transmission of the periodical data message by the other communication nodes;
(C) at least one second node among the a plurality of communication nodes including
a second priority order information transmission unit for transmitting, (a) irrespective of a reception of the reference message and (b) according to a data transmission request, predetermined priority order information that is pre-associated with a non-periodical data message,
a second determination unit for determining which of the priority order information transmitted by the other communication nodes and the priority order information transmitted by the at least one second node represents a higher priority order, and
a second data message transmission unit for transmitting the non-periodical data message in immediate succession to the priority order information when the second determination unit determines that the priority order information transmitted by the at least one second node represents a higher priority order than the priority order represented by the priority order information transmitted by the other communication nodes, wherein,
when the second determination unit determines that the priority order information transmitted by the at least one second node represents a lower priority order than the priority order represented by the priority order information transmitted by the other communication nodes, the second priority order information transmission unit re-transmits the priority order information after completion of transmission of the non-periodical data message by the other communication nodes; and
(D) wherein the priority order of at least one non-periodical data message that is transmitted by the at least one second node has a higher priority order than the priority order of at least one periodical data message that is transmitted by the first node;
a transmission interval, during which the master node periodically transmits the reference message, has a time length for allowing each of all first nodes to transmit a periodical data message once; and
the number of the non-periodical data messages having a higher priority order than the periodical data message is limited to a predetermined value to allow the transmission of all periodical data messages from the first nodes within the transmission interval.

11. A communication system having a plurality of communication nodes connected by a communication bus, the system comprising:
(A) one communication node among the plurality of communication nodes serving as a master node including
a reference message transmission unit for periodically transmitting a reference message that requests other communication nodes for data transmission;
(B) at least one first node among the plurality of communication nodes including
a first priority order information transmission unit for transmitting, in response to a reception of the reference message, predetermined priority order information that is pre-associated with a periodical data message,
a first determination unit for determining which of the priority order information transmitted by the other communication nodes and the priority order information transmitted by the at least one first node represents a higher priority order, and
a first data message transmission unit for transmitting the periodical data message in immediate succession to the priority order information when the first determination unit determines that the priority order information transmitted by the at least one first node represents a higher priority order than the priority order represented by the priority order information transmitted by the other communication nodes, wherein:
when the first determination unit determines that the priority order information transmitted by the at least one first node represents a lower priority order than the priority order represented by the priority order information transmitted by the other communication nodes, the first priority order information transmission unit re-transmits the priority order information after completion of transmission of the periodical data message by the other communication nodes;
(C) at least one second node among the a plurality of communication nodes including
a second priority order information transmission unit for transmitting, (a) irrespective of a reception of the reference message and (b) according to a data transmission request, predetermined priority order information that is pre-associated with a non-periodical data message,
a second determination unit for determining which of the priority order information transmitted by the other communication nodes and the priority order information transmitted by the at least one second node represents a higher priority order, and
a second data message transmission unit for transmitting the non-periodical data message in immediate succession to the priority order information when the second determination unit determines that the priority order information transmitted by the at least one second node represents a higher priority order than the priority order represented by the priority order information transmitted by the other communication nodes, wherein,
when the second determination unit determines that the priority order information transmitted by the at least one second node represents a lower priority order than the priority order represented by the priority order information transmitted by the other communication nodes, the second priority order information transmission unit re-transmits the priority order information after completion of transmission of the non-periodical data message by the other communication nodes; and
(D) wherein the priority order of at least one non-periodical data message that is transmitted by the at least one second node has a higher priority order than the priority order of at least one periodical data message that is transmitted by the first node;
the reference message transmission unit in the master node is capable of transmitting plural type reference messages,
the at least one first node has a transmission data message determination unit for determining a periodical data message that should be transmitted according to a reference message type;
the reference message transmission unit transmits in turn the plural type reference messages, and
when a transmission interval of the periodical data message from the at least one first node is an integer-number-fold interval of a standard interval for transmitting the reference message, the transmission data message determination unit (i) divides, into divided periodical data, a periodical data in the periodical data message that should be transmitted, (ii) selects at least one piece of the divided periodical data from among all pieces of the divided periodical data according to the reference message type, and (iii) establishes, as the periodical data message that should be transmitted, the message that includes the selected piece of the divided periodical data.

12. A communication system having a plurality of communication nodes connected by a communication bus, the system comprising:
(A) one communication node among the plurality of communication nodes serving as a master node including
a reference message transmission unit for periodically transmitting a reference message that requests other communication nodes for data transmission;
(B) at least one first node among the plurality of communication nodes including
a first priority order information transmission unit for transmitting, in response to a reception of the reference message, predetermined priority order information that is pre-associated with a periodical data message,
a first determination unit for determining which of the priority order information transmitted by the other communication nodes and the priority order information transmitted by the at least one first node represents a higher priority order, and a first data message transmission unit for transmitting the periodical data message in immediate succession to the priority order information when the first determination unit determines that the priority order information transmitted by the at least one first node represents a higher priority order than the priority order represented by the priority order information transmitted by the other communication nodes, wherein:

when the first determination unit determines that the priority order information transmitted by the at least one first node represents a lower priority order than the priority order represented by the priority order information transmitted by the other communication nodes, the first priority order information transmission unit re-transmits the priority order information after completion of transmission of the periodical data message by the other communication nodes;

(C) at least one second node among the a plurality of communication nodes including a second priority order information transmission unit for transmitting, (a) irrespective of a reception of the reference message and (b) according to a data transmission request, predetermined priority order information that is pre-associated with a non-periodical data message, a second determination unit for determining which of the priority order information transmitted by the other communication nodes and the priority order information transmitted by the at least one second node represents a higher priority order, and a second data message transmission unit for transmitting the non-periodical data message in immediate succession to the priority order information when the second determination unit determines that the priority order information transmitted by the at least one second node represents a higher priority order than the priority order represented by the priority order information transmitted by the other communication nodes, wherein:

when the second determination unit determines that the priority order information transmitted by the at least one second node represents a lower priority order than the priority order represented by the priority order information transmitted by the other communication nodes, the second priority order information transmission unit re-transmits the priority order information after completion of transmission of the non-periodical data message by the other communication nodes; and (D) wherein the priority order of at least one non-periodical data message that is transmitted by the at least one second node has a higher priority order than the priority order of at least one periodical data message that is transmitted by the first node;

the reference message transmission unit in the master node is capable of transmitting plural type reference messages, the at least one first node has a transmission data message determination unit for determining a periodical data message that should be transmitted according to a reference message type;

the reference message transmission unit transmits in turn the plural type reference messages, and when (i) the transmission interval of the periodical data message that should be periodically transmitted is not equal to an integer-number-fold interval of a standard interval for transmitting the reference message, and (ii) the transmission interval of the periodical data message that should be periodically transmitted is shorter than the transmission interval of the periodical data message, the periodical data message is transmitted as the non-periodical data message having a higher priority order than the periodical data message.

* * * * *